Aug. 15, 1961 R. STÖBE 2,996,351
PROCESS FOR PREVENTING CORROSION OF METALS
Filed June 26, 1957
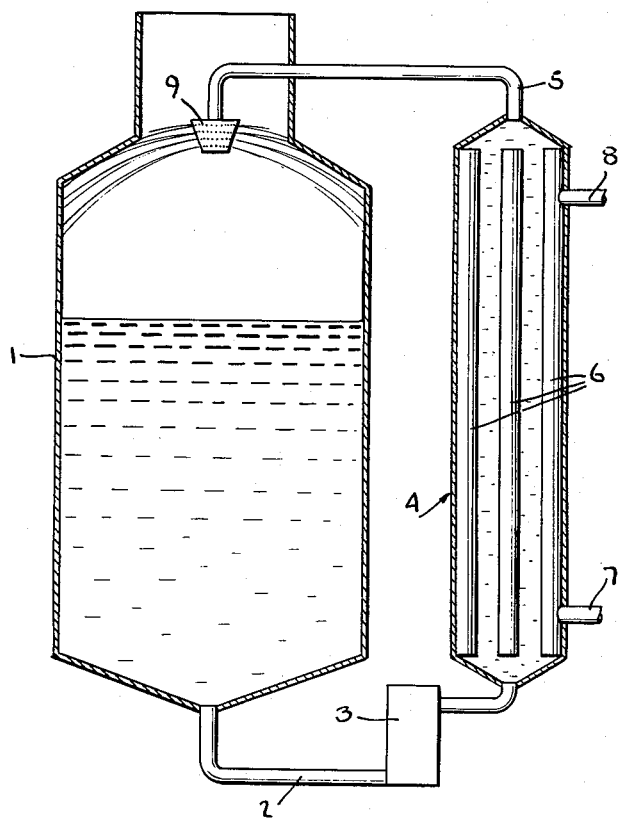
INVENTOR.
ROBERT STÖBE
BY D. Malcolm
ATTORNEY

United States Patent Office 2,996,351
Patented Aug. 15, 1961

2,996,351
PROCESS FOR PREVENTING CORROSION OF METALS
Robert Stöbe, Munich, Germany, assignor to Wacker-Chemie G.m.b.H., Munich, Germany, a German corporation
Filed June 26, 1957, Ser. No. 668,259
Claims priority, application Germany June 29, 1956
2 Claims. (Cl. 21—2.5)

This invention relates to the art of preventing metals from corroding, and it has for its object to provide a novel and improved process for this purpose.

Another object of the invention is to protect metal objects such as the walls of distillation vessels, extractors, etc., from corrosion by the vapors of organic solvents.

Various other objects and advantages will appear as the nature of the invention is more fully disclosed.

It is well known that metals which are in contact with corrosive-acting vapors are attacked thereby, as in the case of the vapors of volatile organic solvents, particularly chlorinated hydrocarbons. An example is found in the walls of metal distillation vessels, extractors and the like. Such corrosion leads after a certain time to the destruction of the apparatus which must then be replaced, with resulting expense, loss of time, etc.

I have discovered a simple and efficient method and apparatus for preventing the corrosion of metal objects and parts which come in contact with corrosively-acting vapors of the above type. The method or process consists essentially in maintaining a film of the liquid (from which the corrosive vapors developed) on the surface of the metal exposed to the vapors, as long as said vapors are present.

The invention is particularly applicable to protecting distillation and extraction apparatus, etc., in which chlorinated hydrocarbons such as trichlorethylene, tetrachlorethylene, etc., are used. In the preferred method and apparatus embodying the invention the liquid chlorinated hydrocarbon solvent is conducted away from the extraction vessel or other container, and such liquid is then fed in a manner hereinafter described to a nozzle or sprinkler device adjacent the top of said vessel and is thereby distributed or sprayed uniformly over the exposed interior wall of said vessel. The liquid film thus continually covers the metal portion of the vessel which would otherwise be directly exposed to the corrosively-acting vapors, and in this manner corrosion of the metal is definitely prevented.

In the simplest embodiment of the invention the chlorinated hydrocarbon liquid is conveyed by a pump. However, it is possible with the aid of heat, and without mechanical power, to circulate the liquid in conjunction with the heating of the distillation or fractionating apparatus, the entire system then automatically starting and stopping as required. For this purpose, at least one heated tube is arranged and connected to the bottom of the extraction or distillation vessel, and this tube opens out above into a sprinkling or trickling device acting on the exposed inner wall of the vessel. Preferably a filter is inserted between the tube and the liquid outlet from the vessel.

The invention is described more in detail in connection with the accompanying drawing which is a schematic view showing a preferred apparatus for carrying out the process.

In the drawing, a metal distilling or extracting vessel 1 of iron, steel, chromium-steel or the like, partly filled with a chlorinated hydrocarbon such as trichlorethylene, tetrachlorethylene or the like, is connected at the bottom through pipe 2 and filter 3 to the bottom of a tower 4 which has an outlet conduit 5 connected to its upper end. The tower 4 contains a group or bundle of connected tubes 6 in which steam or a hot liquid is circulated in any suitable manner through inlet and outlet pipes 7 and 8. The outlet conduit 5 on the upper end of tower 4 terminates within the top of vessel 1 in a spraying or sprinkling nozzle 9.

The operation of the device is as follows: The tower 4 is filled with the liquid chlorinated hydrocarbon from the bottom of the vessel 1, the said liquid flowing upwardly through the narrow space between the heating tubes 6 and the inner wall of the tower 4 in said tower. The steam circulating through the tubes 6 causes the solvent to boil, and the solvent is thereby forced through the conduit 5 to the nozzle 9. The said nozzle 9 directs or sprays the liquid against the entire exposed interior metal wall of the vessel 1, thus continuously coating said wall with a thin solvent film which completely protects the metal from corrosion.

While a specific embodiment has been shown and described herein for purposes of illustration, it will be evident to those skilled in the art that the invention is capable of various modifications and adaptations within the scope of the appended claims.

The invention claimed is:

1. Method of preventing corrosion of a metal by corrosive-acting vapors given off by a liquid chlorinated hydrocarbon, which comprises covering said metal with a protective film by spraying said metal with said liquid chlorinated hydrocarbon as long as said metal is exposed to contact by said vapors.

2. Method of preventing corrosion of the exposed inner wall of a metal vessel which is partly filled with a liquid chlorinated hydrocarbon giving off corrosive-acting vapors, which comprises continuously withdrawing liquid chlorinated hydrocarbon from the bottom of said vessel and spraying same upon the exposed inner wall of said vessel as long as said corrosive-acting vapors are present in said vessel.

References Cited in the file of this patent

UNITED STATES PATENTS

| | | |
|---|---|---|
| Re. 19,374 | Butterworth | Nov. 20, 1934 |
| 1,215,140 | Giller | Feb. 6, 1917 |
| 1,832,697 | Freeman | Nov. 17, 1931 |
| 2,347,669 | Dennis | May 2, 1944 |
| 2,447,746 | Ferris et al. | Aug. 24, 1948 |
| 2,491,732 | Hawkinson et al. | Dec. 20, 1949 |
| 2,550,997 | Harden et al. | May 1, 1951 |
| 2,589,733 | Rosenblad | Mar. 18, 1952 |
| 2,653,882 | Treseder | Sept. 29, 1953 |
| 2,748,036 | Deitrickson | May 29, 1956 |